May 15, 1923. Re. 15,601

W. H. MILLSPAUGH

DEVICE FOR FILLING CENTRIFUGAL CASTING MACHINES

Original Filed Jan. 16, 1912

INVENTOR
WILLIAM H. MILLSPAUGH.

BY E. W. Marshall
ATTORNEY

Reissued May 15, 1923. Re. 15,601

UNITED STATES PATENT OFFICE.

WILLIAM H. MILLSPAUGH, OF SANDUSKY, OHIO, ASSIGNOR TO THE SANDUSKY FOUNDRY & MACHINE COMPANY, OF SANDUSKY, OHIO, A CORPORATION OF OHIO.

DEVICE FOR FILLING CENTRIFUGAL CASTING MACHINES.

Original No. 1,047,972, dated December 24, 1912, Serial No. 671,457, filed January 16, 1912. Application for reissue filed October 4, 1921. Serial No. 506,306.

*To all whom it may concern:*

Be it known that I, WILLIAM H. MILLSPAUGH, a citizen of the United States of America, and a resident of the city of Sandusky, county of Erie, and State of Ohio, have invented certain new and useful Improvements in Devices for Filling Centrifugal Casting Machines, of which the following is a specification, reference being had to the accompanying drawings, forming a part thereof.

My invention relates to a device for feeding molten metal to centrifugal casting machines.

The object of the invention is to provide a device for holding a large supply of molten metal in a position to be quickly dumped into a centrifugal casting machine in which the resulting casting is to be of small internal diameter but having comparatively thick walls, thus necessitating the introduction of a large amount of molten metal through a feed pipe or trough of comparatively small diameter.

I will describe my invention in the following specification and point out the novel features thereof in the appended claims.

Figure 1:
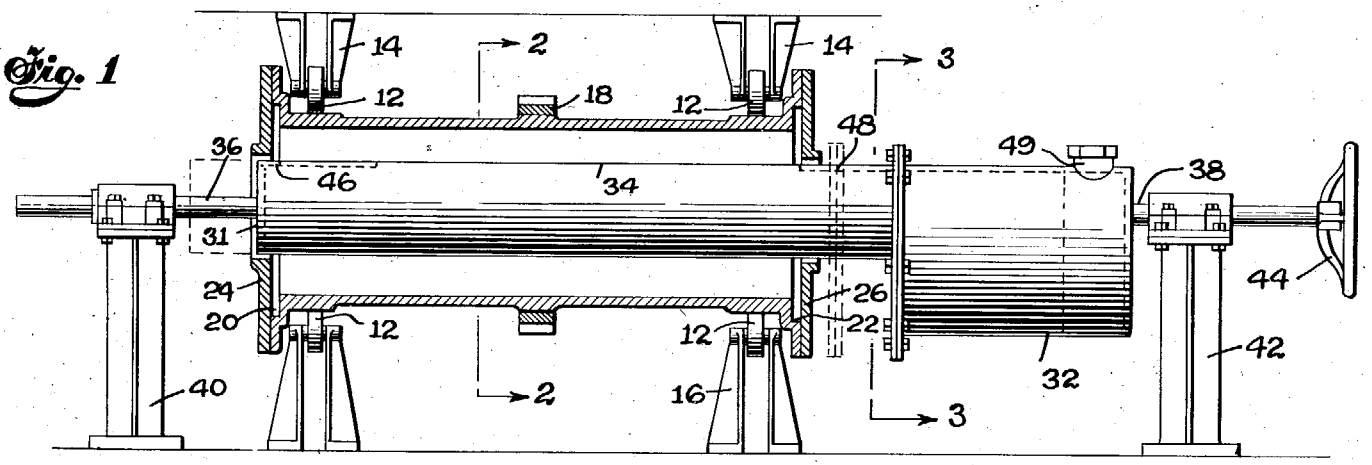
Figure 4:
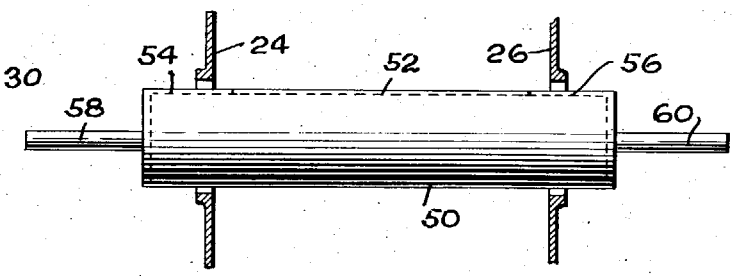
Figure 3:
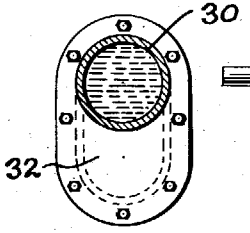
Figure 2:
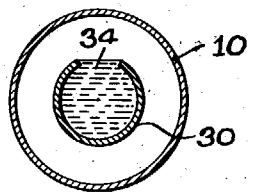

In the accompanying drawing, Fig. 1 is a central longitudinal section, with parts in elevation, of one embodiment of the invention. Fig. 2 is a transverse vertical section taken on the line 2—2 of Fig. 1. Fig. 3 is a similar view taken on the line 3—3 of Fig. 1. Figure 4 is a side elevation of a modified form of trough.

Like characters of reference designate corresponding parts in all of the figures.

As illustrated in the drawing the centrifugal casting machine comprises a cylinder 10, rotatably mounted on rolls 12, journaled in suitable bearings 14, 16 in proximity to the ends of the cylinder. The cylinder 10 is surrounded intermediate its length by a gear 18 which is adapted to be in driving relation with any suitable source of power to enable the cylinder to be rotated at a high rate of speed. The internal configuration of the cylinder, which in this instance acts as a mold, may be of any desired shape. As illustrated, the cylinder is shaped to cast a pipe having flanges at each end formed in the annular recesses 20, 22. The ends of the cylinder 10, are provided with plates, 24, 26, which may be bolted thereto, or held by clamps, not shown. These end plates have a comparatively small central hole therethrough so that the machine is adapted to cast a pipe having a comparatively small internal diameter but with thick walls.

To introduce the molten metal into the cylinder I provide a dumper or feeder. In its preferred embodiment it comprises a trough 30, preferably made in the form of a circular pipe closed at one end 31 and communicating at its other end with a reservoir 32 to be hereinafter described, said trough having a longitudinal opening or slot 34 along one of its sides. The slot 34 is preferably of substantially the same length as the distance between the inner faces of the end plates 24, 26 on the cylinder 10. The dumper is provided at its ends with journals 36, 38 rotatable in bearings 40 and 42, respectively. A hand wheel 44 is provided at one end by means of which the dumper may be turned to discharge its contents into the cylinder. The dumper in the preferred form shown is also arranged to be moved longitudinally in and out of the cylinder 10, and for this reason its journals 36 and 38 are elongated.

It has been found in practice that when a pipe is to be cast having a small internal diameter and thick walls, it is impossible to hold enough metal in a plain trough open throughout its length and of sufficiently small diameter to enter the pipe which is to be cast. Consequently in one form of the invention I have provided a reservoir 32 which is in communication with the trough 30 but located outside of the cylinder 10. This reservoir is preferably bolted to the open end of the trough 30, and with the major portion of its capacity below its axis of rotation. If desired it may be cast integrally therewith. The open side of the trough 30 may be closed at each end at 46, 48 for a short distance so that the length of the slot 34 is substantially equal to internal length of the cylinder 10.

With the dumper in the position shown in full lines in Fig. 1 the molten metal may be introduced either through the exposed end of the open slot 34, or through a feed hole, in the top of reservoir 32, fitted with a removable plug 49. The trough 30 and reservoir 32 having been filled the longitudinal movement of the dumper to the position shown in dotted lines, brings the same into position for the discharge of the metal into the mold. If no longitudinal movement of the dumper in the casting operation is necessary or desired, the dumper may be filled through the feed hole in the reservoir only, and during the filling and dumping operation may remain in the position shown in dotted lines.

A modified form of feeding device is shown in Fig. 4 which comprises a long trough 50, of substantially the same cross-section as that shown in Fig. 2, and provided with an elongated slot or discharge opening 52 in one side thereof, which is substantially the same length as that of the article which is to be cast. In order to provide sufficient capacity in the trough for holding a large volume of metal within a small diameter, I extend the trough at one or both ends beyond the limits of the discharge opening 52, so that the portions 54 and 56 of the trough are closed.

Trunnions and shafts 58 and 60 are provided at the ends of the trough so that it may be rotated, and, if desired, to provide for longitudinal movement as explained above.

In using the device the desired amount of molten metal may be poured into the dumper through a feed hole, in the top and at one end thereof, fitted with a removable plug 49; or, if desired, the dumper may be moved longitudinally and the metal poured in through the exposed end of the slot. After it has been filled the dumper, being in position within the rapidly rotating cylinder, may be turned and its contents poured out through the discharge slot.

What I claim is;

1. A filling device for centrifugal casting machines comprising a closed trough arranged to be rotated and having a discharge opening through one side thereof shorter than the trough and through which the molten metal is discharged into the interior of the machine and having a feed hole, longitudinally spaced from the discharge opening, the trough being closed between the feed hole and discharge opening.

2. A filling device for centrifugal casting machines, comprising an elongated trough arranged to be rotated and provided with an elongated discharge opening through one side thereof, said trough being closed beyond the ends of said opening to provide a large capacity with comparatively small diameter.

3. A hollow rotary member, a filling trough arranged to be rotated in said member, and a reservoir communicating with said trough and rotatable therewith.

4. A hollow rotary member, a filling trough arranged to hold molten metal and provided with a discharge opening in one side of substantially the interior length of said member, and a closed reservoir communicating with said trough.

5. A hollow rotary member, a filling trough rotatably and slidably supported projecting into said member and provided in one side with a discharge opening of substantially the length of the casting to be made, and a reservoir communicating with said trough and movable therewith.

6. A hollow rotary cylinder of comparatively large diameter having one of its ends fitted with a plate having a central hole of comparatively small diameter, a filling trough rotatably supported and extending through the hole in said plate, and a reservoir communicating with said trough and rotatable therewith.

7. A dumper for centrifugal casting machines, comprising a trough rotatably and slidably mounted and having an elongated discharge opening in one side thereof, and a closed reservoir communicating with said trough and movable therewith.

8. A dumper for supplying molten metal to a centrifugal casting machine, comprising a rotatable cylindrical trough open along one side, and a reservoir communicating with said trough, said reservoir having the major portion of its capacity below the axis of rotation when it is in position to be filled.

9. In combination, a filling device for centrifugal casting machines comprising a closed trough arranged to be rotated and having a discharge opening through one side thereof which is shorter than the trough and through which the molten metal is discharged into the interior of the machine, said trough having a feed hole longitudinally spaced from the dischare opening and being closed between the feed hole and the discharge opening and extending through an end of the cylinder and through the opening in the end plate, and a rotatable cylinder having end plates, at least one of the plates being provided with a central circular opening, the trough extending through the cylinder and through the opening in the end plate and the portion of the trough in said opening being circular in section.

10. In combination, a filling device for centrifugal casting machines comprising a closed trough arranged to be rotated and having a discharge opening through one side thereof which is shorter than the trough and through which the molten metal is discharged into the interior of the machine, said trough having a discharge opening through one side thereof shorter than the trough and through which the metal is discharged into the interior of the machine and having a feed hole longitudinally spaced from the discharge opening, and a rotatable cylinder, the trough being rotatably supported and invertible in said cylinder and extending through one end of the cylinder.

In witness whereof, I have hereunto set my hand this 29 day of September, 1921.

WILLIAM H. MILLSPAUGH.